US009748846B2

(12) United States Patent
Jiang et al.

(10) Patent No.: US 9,748,846 B2
(45) Date of Patent: Aug. 29, 2017

(54) POWER SUPPLY WITH DROOP CONTROL FEEDBACK FOR ENHANCED PHASE CURRENT SHARING

(71) Applicant: INTERSIL AMERICAS LLC, Milpitas, CA (US)

(72) Inventors: Shuai Jiang, San Jose, CA (US); Jian Yin, San Ramon, CA (US); Zhixiang Liang, San Ramon, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 0 days.

(21) Appl. No.: 14/466,846

(22) Filed: Aug. 22, 2014

(65) Prior Publication Data

US 2015/0115910 A1    Apr. 30, 2015

Related U.S. Application Data

(60) Provisional application No. 61/896,636, filed on Oct. 28, 2013.

(51) Int. Cl.
*H02M 3/158*    (2006.01)
*H02J 1/10*    (2006.01)

(52) U.S. Cl.
CPC ..... *H02M 3/1584* (2013.01); *H02J 2001/106* (2013.01)

(58) Field of Classification Search
CPC ....... H02M 3/1584; H02M 2001/0009; H02M 2003/1586; H02J 2001/106
See application file for complete search history.

(56) References Cited

U.S. PATENT DOCUMENTS

| 5,760,720 A | 6/1998 | Nolan et al. | |
| 6,175,727 B1 * | 1/2001 | Mostov | H01F 17/0006 174/255 |
| 6,424,129 B1 * | 7/2002 | Lethellier | H02M 3/1584 323/272 |

(Continued)

OTHER PUBLICATIONS

"Digital Controller for Isolated Power Supply with PMBus Interface", 2013, pp. 1-108, Publisher: Analog Devices, Inc.

(Continued)

*Primary Examiner* — Harry Behm
*Assistant Examiner* — Peter Novak
(74) *Attorney, Agent, or Firm* — Foley & Lardner LLP; Mark J. Danielson

(57) ABSTRACT

A system, power supplies, controller and method for enhanced phase current sharing are disclosed. For example, a power supply for enhanced phase current sharing is disclosed, which includes a plurality of power modules, a communication bus coupled to an input of each power module of the plurality power modules, and an output voltage node coupled to a first side of an inductor of each power module of the plurality of power modules, wherein each power module of the plurality of power modules includes a digital controller coupled to the input of the power module, and an RC circuit enabled to generate a feedback signal, coupled to a second side of the inductor and the output voltage node. In some implementations, the power supply is at least part of a power management integrated circuit (PMIC) or at least part of a power supply formed on a semiconductor IC, wafer, chip or die.

15 Claims, 5 Drawing Sheets

(56) References Cited

U.S. PATENT DOCUMENTS

| | | | |
|---|---|---|---|
| 6,894,466 B2* | 5/2005 | Huang | H02M 3/1584 323/272 |
| 7,019,581 B1 | 3/2006 | Potanin et al. | |
| 7,154,381 B2* | 12/2006 | Lang | H04L 12/10 340/12.32 |
| 7,206,343 B2 | 4/2007 | Pearce | |
| 7,262,628 B2 | 8/2007 | Southwell et al. | |
| 7,301,317 B1 | 11/2007 | Mattingly | |
| 7,417,413 B2* | 8/2008 | Noma | H02M 3/156 323/284 |
| 7,492,132 B2* | 2/2009 | Kuroiwa | H02M 3/156 323/222 |
| 8,228,049 B2 | 7/2012 | Qiu et al. | |
| 8,233,299 B2* | 7/2012 | Ahmad | H02M 3/1584 363/65 |
| 8,237,423 B2 | 8/2012 | Heineman et al. | |
| 2007/0200538 A1* | 8/2007 | Tang | H02M 3/157 323/237 |
| 2008/0203985 A1* | 8/2008 | Dong | H02M 3/1584 323/272 |
| 2010/0013307 A1* | 1/2010 | Heineman | G06F 1/26 307/33 |
| 2010/0033145 A1* | 2/2010 | Tseng | H02M 3/156 323/282 |
| 2010/0238060 A1* | 9/2010 | Nien | H02M 3/1584 341/155 |
| 2015/0222183 A1* | 8/2015 | Karlsson | H02M 3/156 323/271 |

OTHER PUBLICATIONS

"Adaptive Digital DC-DC Controller with Current Sharing Data Sheet", Feb. 15, 2011, pp. 1-42, Publisher: Intersil Zilker Labs.

* cited by examiner

POWER SUPPLY WITH DROOP CONTROL FEEDBACK FOR ENHANCED PHASE CURRENT SHARING

CROSS-REFERENCE TO RELATED APPLICATIONS

This application is related to U.S. Provisional Patent Application Ser. No. 61/896,636 entitled "POWER SUPPLY WITH BALANCED CURRENT SHARING," filed on Oct. 28, 2013 and incorporated herein by reference. This application hereby claims to the benefit of U.S. Provisional Patent Application Ser. No. 61/896,636.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings.

DETAILED DESCRIPTION

Figure 1:
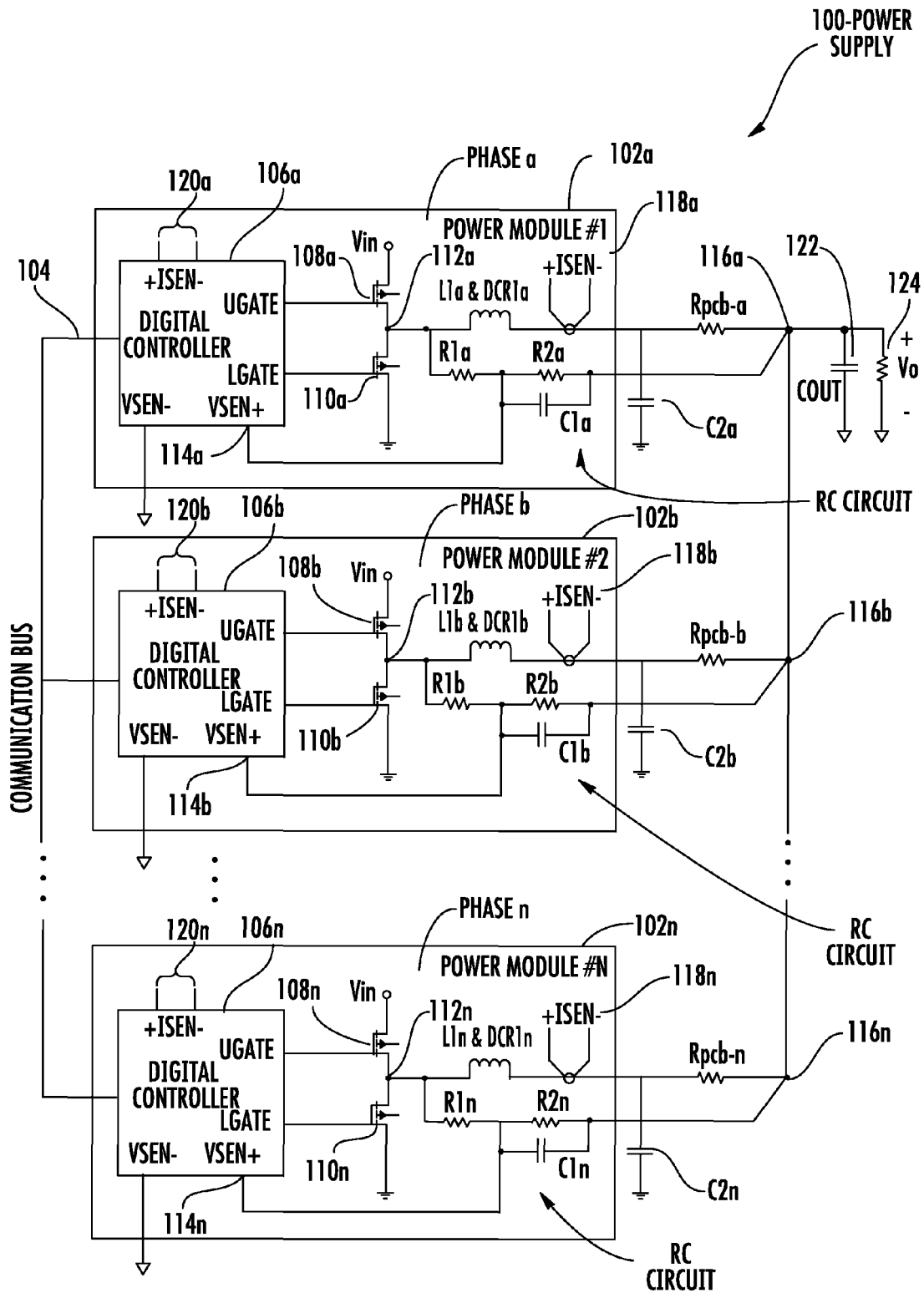
FIG. 1 is a schematic block diagram of a power supply, which can be utilized to implement one or more exemplary embodiments of the present invention.

In the following detailed description, reference is made to the accompanying drawings that form a part hereof, and in which are shown by way of specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be construed in a limiting sense. Wherever possible, the same or like reference numbers are used throughout the drawings to refer to the same or like structural components or parts.

Droop compensation control can be utilized to increase the DC output impedance of a voltage converter (e.g., in a switched mode power supply) and lower its output voltage as its load current is increased. For example, droop compensation control can be utilized in DC-to-DC voltage converters such as, for example, multiphase pulse width modulated (PWM) controllers and voltage regulators operating in parallel with phase current sharing to balance the output current phases being shared. Active droop control is droop compensation control that senses the current through the output inductor of a voltage converter and utilizes the sensed current information to adjust the output voltage of the converter and maintain the amount of droop required.

Embodiments described herein provide power supplies with enhanced phase current sharing. In some embodiments, a power supply with enhanced phase current sharing can include a plurality of DC-to-DC voltage converters and/or voltage regulators operating in parallel. As such, for example, a power supply with enhanced phase current sharing can be formed on a semiconductor structure, such as a semiconductor integrated circuit (IC), wafer, chip or die. In one exemplary embodiment, active droop control is provided in a multiphase power supply to automatically compensate for droop mismatches that can occur between the multiple phases. Also, digital calibration control is provided in the multiphase power supply to enhance the balancing of the multiple output phase currents involved.

More precisely, embodiments described herein provide a power supply with enhanced phase current sharing. For example, in one embodiment, enhanced phase current sharing in a multiple phase power supply is accomplished by adding a respective analog feedback signal to each digital control loop being utilized to control a phase. Specifically, the power supply includes a plurality of power modules. Each power module of the plurality of power modules includes a digital controller, and each digital controller of the plurality of digital controllers is coupled to a communication bus for transferring current and voltage data between it and the other digital controllers. The output of each power module is coupled to a common output node, and the combination of the plurality of power modules thereby forms a multiphase power supply with output phase current sharing and active droop control. For example, in one embodiment, each power module of the plurality of power modules can be a digitally-controlled voltage converter, such as a digital, voltage mode-controlled PWM buck converter.

Each power module of the plurality of power modules includes an RC circuit coupled across an output inductor that generates the output phase current for that module. One side of the RC circuit is coupled to the phase node of the power module, and the other side of the RC circuit is coupled to a common output voltage node of the power supply at the load side. Thus, the resistance of the printed circuit board (PCB) utilized to couple the power module to the output of the power supply is included by the RC circuit at the load side. The RC circuit is also coupled to a positive voltage sense input terminal of the digital controller involved. Consequently, the RC circuit is utilized to sense and thereby obtain analog output voltage droop information for the power module involved. The digital controller communicates with the other digital controllers in the power supply to utilize the sensed analog output voltage droop information of each power module and automatically compensate for any droop mismatches that occur due to the different layouts and resistances for the PCBs involved. Also, the digital controllers communicate with each other and thereby automatically compensate for any mismatches of the voltage command DC offsets that occur. Specifically, the digital controllers communicate with each other and automatically move the load lines of their respective power modules until the load lines are aligned or overlap, which significantly increases the accuracy of the active droop compensation and the precision of the output phase current balancing in comparison with conventional power supplies.

In accordance with one exemplary embodiment, a power supply with enhanced phase current sharing is provided with active droop control, which utilizes a passive circuit to sense analog output voltage droop information and utilize that information to enhance the accuracy of the phase current sharing in response to transients in the load. Also, the power supply with enhanced phase current sharing is provided with digital calibration control to balance the output phase currents being shared, by compensating for the different DC resistances of the output inductors and PCB traces for the power modules involved. The digital calibration control automatically trims the reference voltage of each power module to correct for load line offset mismatches, and also provides the droop control values needed by the power modules to compensate for the various DC resistances of the output inductors and PCB impedances involved.

FIG. 1 is a schematic block diagram of a power supply 100, which can be utilized to implement one or more exemplary embodiments of the present invention. For example, in one embodiment, power supply 100 can be utilized to implement enhanced phase current sharing for a plurality of point-of-load (POL) power modules functioning as voltage converters. In some embodiments, power supply 100 can be utilized to implement a multiphase power supply with a plurality of PWM buck converters. In other embodiments, power supply 100 can be utilized to implement one or more PWM controller integrated circuits (ICs) or voltage regulator IC modules. In still other embodiments, power supply 100 can be utilized to implement a plurality of voltage mode-controlled DC-to DC voltage converters with enhanced phase current sharing. In general, power supply 100 can be utilized to implement a power supply with enhanced phase current sharing in a semiconductor structure, such as, for example, a semiconductor IC, wafer, chip or die. In some embodiments, power supply 100 can be utilized to implement all or part of an integrated power management IC (PMIC).

Referring to the exemplary embodiment shown in FIG. 1, power supply 100 includes a plurality of power modules 102a-102n. The first power module 102a and the second power module 102b through the n$^{th}$ power module 102n are coupled to a communication bus 104. In some example embodiments, one of the power modules 102a-102n can operate as a "master" device on the communication bus 104, and the remaining power modules 102a-102n can operate as "slave" devices. For example, such a "master" device can be any power module 102a-102n that initiates communications with the other ("slave") power modules, and a "slave" device can be any power module 102a-102n that responds to a communication from a "master" device. In some embodiments, the communication bus 104 can be implemented utilizing a computer bus operating in accordance with the I²C communication protocol or the SMBus communication protocol. In other embodiments, the communication bus 104 can be implemented utilizing a suitable digital communication line that is capable of communicating digital data between the power modules 102a-102n and thereby facilitating the processing of algorithms implemented by software/firmware residing on the power modules involved. For example, a digital processor (e.g., including a microcontroller, microprocessor, and the like) can be coupled to the communication bus 104 to implement digital communications between the power modules 102a-102n in a hierarchical (e.g., master/slave) operation. As such, in one embodiment, the communication bus 104 is utilized to transfer current and voltage data from the "master" power module to the "slave" power modules involved.

In the exemplary embodiment shown in FIG. 1, each power module 102a-102n includes a respective digital controller 106a-106n. For example, power module 102a includes a digital controller 106a, power module 102b includes a digital controller 106b, and so on. In one embodiment, the digital controller 106a can be a suitable microcontroller or microprocessor that implements program code (e.g., firmware) to communicate data to and from one or more of the other power modules 102b-102n, and also output control data to switch a pair of power transistors 108a, 110a. For example, in one embodiment, power module 102a can be utilized to implement a power module as a voltage-mode controlled buck converter. In another embodiment, the power module can be implemented as a boost converter. Returning to the embodiment depicted in FIG. 1, power transistor 108a can be a high-side field-effect transistor (FET) in the power module 102a, and power transistor 110a can be a low-side FET. Digital controller 106a provides a first switch control signal at a first output (UGATE), which is coupled to the control terminal of power (switch) transistor 108a. Digital controller also provides a second switch control signal at a second output (LGATE), which is coupled to the control terminal of power (switch) transistor 110a. Thus, digital controller 106a controls the switching of the power transistors 108a, 110a to produce a square wave signal (phase a) at the node 112a between the power transistors 108a, 110a. The square wave signal (phase a) at node 112a can be a pulse-width modulation (PWM) signal. Thus, in the exemplary embodiment shown, digital controller 106a can be utilized to implement a PWM voltage converter (e.g., buck converter).

The node 112a (phase a) is coupled to one end of an inductor L1a and resistor R1a. The second end of the resistor R1a is coupled to one end of a capacitor C1a, one end of a second resistor R2a, and an input (VSEN+) 114a of the digital controller 106a. The second end of the second resistor R2a is coupled to the second end of the capacitor C1a and an output node 116a. The second end of the inductor L1a is coupled to a current sensor (ISEN) 118a, which is coupled to a second input (ISEN) 120a of the digital controller 106a. The second end of inductor L1a is further coupled to one side of a resistor Rpcb-a (e.g., indicating the resistance of the copper PCB trace lines involved) and also to one side of a capacitor C2a (e.g., indicating a capacitance of the PCB trace lines involved). The second side of resistor Rpcb-a is coupled to the output node 116a. The output node 116a is coupled to one side of an output capacitor 122 (COUT) and load 124. The second sides of output capacitor 122 and output resistor 124 are coupled to circuit ground. Thus, the voltage at the output node 116a is developed across the output capacitor 122 and load 124 to produce the output voltage signal, $V_O$, of power supply 100. Notably, in the exemplary embodiment shown, the configurations of the plurality of power modules 102a-102n are substantially the same, and the power modules 102a-102n function to operate in substantially the same manner. Consequently, the plurality of power modules 102a-102n generate a single, output voltage signal, $V_O$, on the shared output node 116a-116n and across the output resistor 124 to circuit ground. As such, the power modules 102a-102n share their respective phase currents (e.g., sensed by the current sensors 118a-118n), which are coupled to the output node 116a-116n, to develop the output voltage signal, $V_O$.

Essentially, in accordance with one or more embodiments of the present invention, power supply 100 includes a passive network of circuit components to provide active droop output current sharing. Power supply 100 also includes digital processing to calibrate and balance the shared output phase currents in order to compensate for the different DC resistance values (e.g., indicated as DCR1a-DCR1n) of the inductors L1a-L1n in the power modules 102a-102n. The digital processing is also utilized to compensate for the different resistance values (e.g., indicated as Rpcb-a through Rpcb-n) of the PCB traces (e.g., copper traces) for each phase. In one exemplary embodiment, the digital processing and calibration is provided by one or more algorithms implemented in firmware utilizing a suitable microcontroller or microprocessor in each digital controller 106a-106n. Also, in one exemplary embodiment, the active droop output current sharing is provided with a respective resistance-capacitance (RC) network coupled to the output node 116a-116n on one side, and the switch side of each inductor L1a-L1n on the other side. For example, in the embodiment shown in FIG. 1, an RC network for active droop output current sharing is implemented utilizing the resistors R1a-R1n, R2a-R2n, and the capacitors C1a-C1n.

Referring to the exemplary embodiment depicted in FIG. 1, it is useful at this point to utilize an iterative, sequential series operator, K, to describe the digital processing operations described hereinafter to implement active droop compensation and digital calibration to balance and thereby enhance the output phase current sharing for the plurality of power modules 102a-102n. As such, for each power module #K, an RC network ($R_{1-K}$, $R_{2-K}$ and $C_{1-K}$) is connected across the respective phase node and positive rail of the output voltage terminal at the load side. The voltage at the junction point between the resistors $R_{1-K}$, $R_{2-K}$ is coupled to the sensed voltage input (VSEN+) of the digital controller in each power module 102a-102n. Notably, the sensed voltage input (VSEN+) includes and thus accounts for the resistance of the PCB trace lines involved. The transfer function in the continuous time domain for the sensed voltage ($V_{SEN+}$) for each of the "slave" power modules can be expressed as follows:

$$V_{SEN-K}(s) = V_o(s) + I_K(s)\frac{1+\frac{L_{1-K}s}{DCR_{1-K}+R_{pcb-K}}}{1+\frac{R_{1-K}R_{2-K}}{R_{1-K}+R_{2-K}}C_{1-K}s}(DCR_{1-K}+R_{pcb-K})\frac{R_{2-K}}{R_{1-K}+R_{2-K}} \quad (1)$$

where K=1, 2, . . . , N

The DC resistance utilized to establish the voltage droop for a power module (e.g., analog droop) can derived from Equation (1) and expressed as follows:

$$R_{droop_{a(K)}} = (DCR_{1-K}+R_{pcb-K})\frac{R_{2-K}}{R_{1-K}+R_{2-K}} \quad (2)$$

where K=1, 2, . . . , N.

Note that, in an ideal or theoretical case, if a plurality of identical power modules were to be utilized to generate a plurality of identical output phase currents, the layouts of the PCBs utilized were identical (symmetrical PCB layout), and the RC network utilized had identical resistances and capacitances, then Equation (2) would provide an identical droop resistance value for all of the phases. However, the resistances of the different PCB trace lines are relatively small compared to the DC resistances of the inductors utilized in the power modules involved. Consequently, the parameter $R_{pcb}$ in the analog droop Equation (2) is not dominant and can be considered insignificant compared to the parameter DCR (the DC resistance needed to establish the voltage droop for a power module) in Equation (2).

In operation, the firmware in each "slave" digital controller 102a-102n processes the algorithm for Equation (1) and derives the respective sensed voltage, VSEN+. The firmware in each "slave" digital controller 102a-102n processes the algorithm of Equation (2) utilizing the respective RC network parameters and sensed voltage, (VSEN+), and derives the DC resistance value needed to provide the required output voltage droop compensation value for the phase involved. Each digital controller 106a-106n outputs suitable PWM control signals (UGATE, LGATE) to drive the respective switching transistors (108a-108n, 110a-110n), and thus generate the respective phase currents 112a-112n to develop the output voltage with active droop compensation at the output nodes 116a-116n.

Notably, in addition to the sensed input voltage, VSEN+, the sensed current (ISEN), which is coupled to the input 120a-120n of the respective digital controller 106a-106n, can also be utilized to generate the output voltage droop resistance value. For example, the firmware in a digital controller 106a-106n can utilize a suitable algorithm to derive the transfer function of the sensed current (ISEN), and process Equation (2) with the respective Rpcb and DCR values to generate the output voltage droop required.

Figure 2:
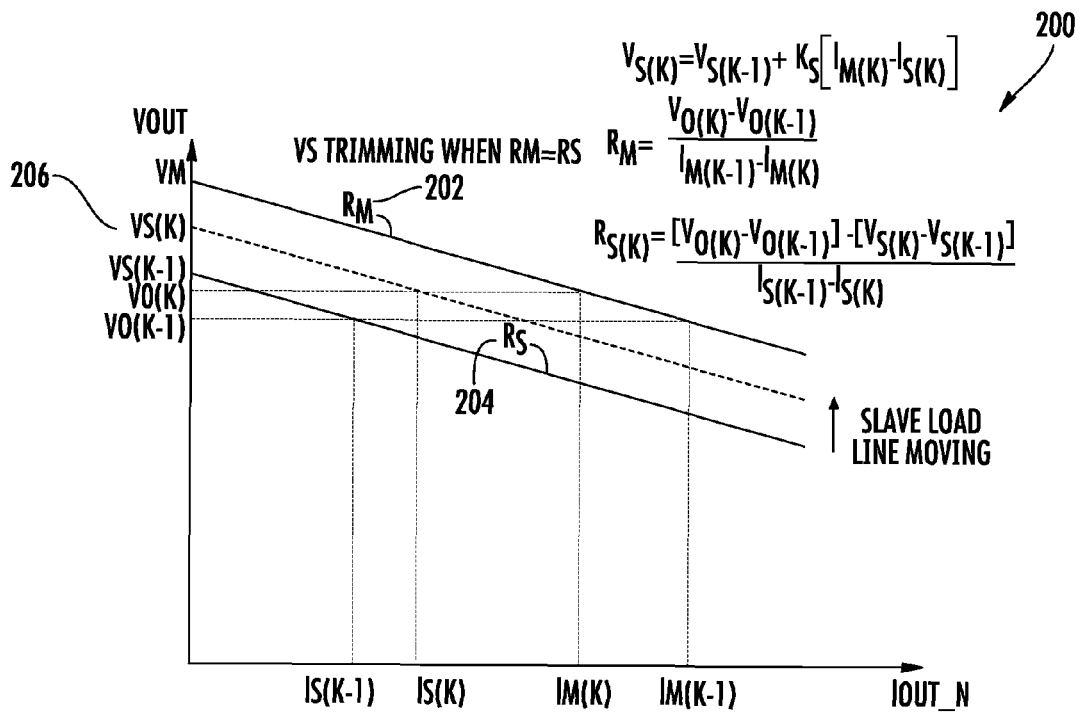
FIG. 2 is a voltage versus current diagram, which illustrates an ideal situation in which the load lines are identical for a plurality of power modules.

FIG. 2 is a voltage versus current diagram 200, which illustrates an ideal or theoretical case in which the respective load lines (and associated droop resistance values) for all of the power modules 102a-102n are identical. For example, the resistance value 202 ($R_M$), indicates the load line slope for a master module involved. Also, the resistance value 204 ($R_S$) indicates the load line slope for a slave module involved. Notably, the slopes of the load lines 202, 204 are identical in this theoretical case. However, in an actual operating environment, the command voltage, $V_S$, for each module 102a-102n will have a slightly different offset, which causes an imbalance between the output phase currents of the modules 102a-102n (even if the slopes of their load lines were to be identical). However, in one exemplary embodiment, the firmware in each slave module is utilized to "trim" its respective command voltage, $V_S$, in order to move and thereby align its respective load line with the load line of the master module involved. This trimming of the command voltage, $V_S$, in order to align the load line of each slave module with the load line of the master power module, significantly increases the accuracy of the process for balancing the output phase currents of the power modules involved.

For example, referring to FIG. 2, the droop resistance, $R_M$, 202 of a master module can be expressed as follows:

$$R_M = \frac{V_{0(K)} - V_{0(K-1)}}{I_{M(K-1)} - I_{M(K)}} \quad (3)$$

Also, for example, the droop resistance, $R_{S(K)}$, 204 of a slave module can be expressed as follows:

$$R_{S(K)} = \frac{[V_{0(K)} - V_{0(K-1)}] - [V_{S(K)} - V_{S(K-1)}]}{I_{S(K-1)} - I_{S(K)}} \quad (4)$$

Thus, the control voltage, $V_{S(K)}$, 206 that can be utilized by a slave module to move its load line to the load line of the master module can be derived from Equations (3) and (4), and expressed as follows:

$$V_{S(K)} = V_{S(K-1)} + K_S[I_{M(K)} - I_{S(K)}] \quad (5)$$

For example, referring to FIG. 2 and Equation (5), if the output current of the master module is higher than the detected output current of the slave module, the slave module can increase, or trim up, its output voltage 206, or $V_{S(K)}$. Consequently, the master module's inductor current will be decreased while the inductor current of the slave module involved will be increased, until their load lines are aligned. On the other hand, also referring to FIG. 2 and Equation (5), if the detected load current of a slave module is higher than the output current of the master module involved, then the slave module can decrease, or trim down, its output voltage 206, or $V_{S(K)}$. Consequently, the master module's inductor current will be increased while the inductor current of the slave module will be decreased, until their load lines are aligned. Notably, the optimal or most accurate output phase current sharing or balancing is achieved when each of the slave modules' load lines is aligned with the load line of the master module involved. In sum, each digital controller 106a-106n is enabled to automatically trim its own command voltage, $V_S$, and thereby enhance the overall accuracy of the output phase current balancing of the power supply 100.

Figure 3:
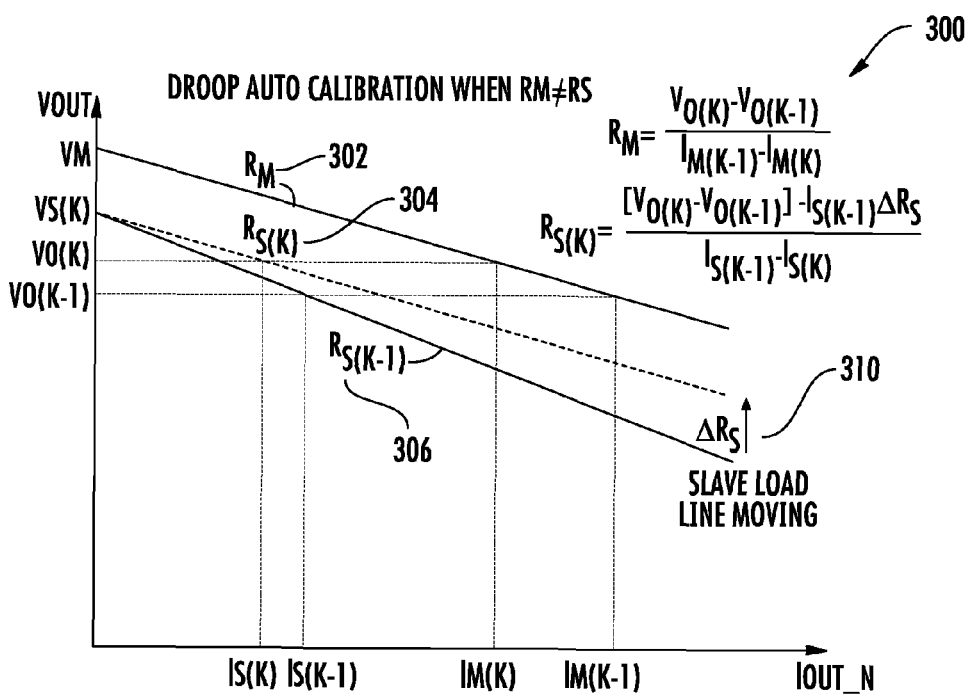
FIG. 3 is a voltage versus current diagram, which illustrates a practical situation in which the slopes of the load lines for one or more slave modules are not equal to the slope of the load line for the master module involved.

FIG. 3 is a voltage versus current diagram 300, which illustrates a practical situation in which the slopes of the respective load lines for one or more slave modules 102a-102n are not equal to the slope of the load line for the master module involved. For example, referring to FIG. 3, the resistance value 302 ($R_M$), indicates the load line for the master module, the resistance value 304 ($R_{S(K)}$) indicates the load line for the "Kth" slave module involved, and the resistance value 306 ($R_{S(K-1)}$) indicates the load line for the K-1$^{st}$ slave module involved. Notably, the droop resistance 302 ($R_M$) of a master module is described by Equation (3) above. However, in this case, the droop resistance 304 of the Kth slave module can be modified by adding or subtracting a fixed resistance value 310 ($\Delta R_S$) at each step, in order to move the load line ($R_{S(K)}$) of the respective slave module incrementally in the correct direction to align it with the load line 302 ($R_M$) of the master module involved. In this case, the digital droop resistance value for a slave module can be expressed as follows:

$$R_{S(K)} = \frac{[V_{0(K)} - V_{0(K-1)}] - I_{S(K-1)}\Delta R_S}{I_{S(K-1)} - I_{S(K)}} \quad (6)$$

where K=1, 2, . . . , N.

Notably, Equation (6) can be utilized by the firmware in each digital controller 106a-106n to automatically calculate the digital droop resistance, $R_S$, needed to align its load line to the load line of the master module, by inputting voltage and current data communicated between the master module and slave modules to Equation (6). As such, this digital calibration of the slave modules further enhances the accuracy of the output phase current balancing for the power supply 100.

Figure 4:
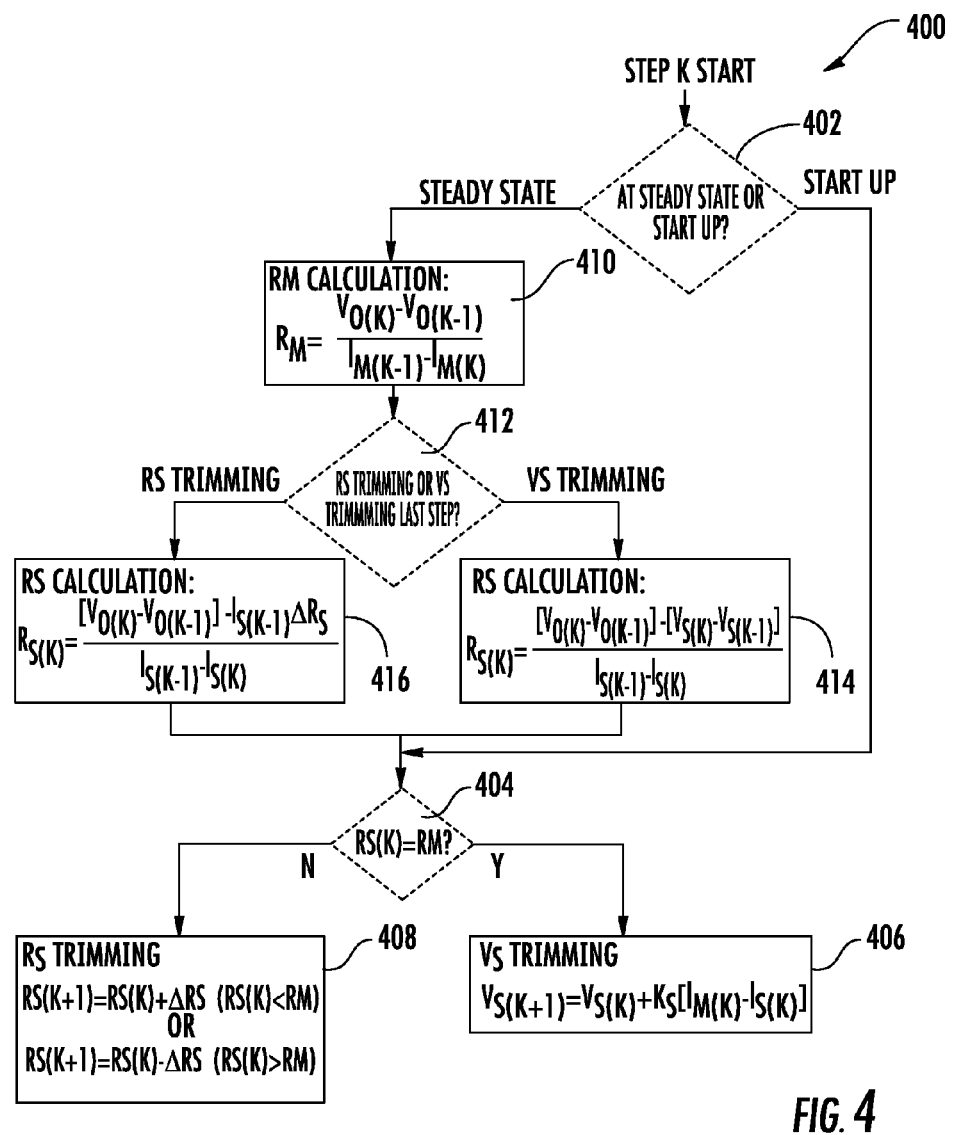
FIG. 4 is a flowchart depicting an exemplary method of operation for a power supply with enhanced phase current sharing, in accordance with one or more embodiments of the present invention.

FIG. 4 is a flowchart depicting an exemplary method of operation 400 for a power supply with enhanced phase current sharing, in accordance with one or more embodiments of the present invention. For example, the exemplary method 400 can be utilized by each digital controller 106a-106n shown in FIG. 1 to provide enhanced phase current sharing. Referring to FIG. 4, the method 400 begins (402) by determining if the power supply 100 is in a startup mode of operation or steady state mode of operation. If the power supply is in a startup mode of operation, the flow proceeds (404) to determine if the load line of the K$^{th}$ slave module (e.g., characterized by the droop resistance of that module) is equal to the load line of the master module involved. If the slope of the load line of the K$^{th}$ slave module is equal to the slope of the load line of the master module involved, the flow proceeds (406) to enable the respective digital controller to utilize its resident firmware to process Equation (5) above and thereby automatically trim its respective command voltage, $V_S$, to compensate for any voltage offset that occurs. However, if (406) the load line of the K$^{th}$ slave module is not equal to the load line of the master module involved, the flow proceeds (408) to enable the K$^{th}$ digital controller to utilize Equation (6) and add or subtract a suitable fixed resistance ($\Delta R_S$) and thereby automatically trim its droop resistance to compensate for load line imbalances.

Returning to the start (402), if the power supply 100 is in the steady state mode of operation, the flow proceeds (410) to enable the digital controller of the master module to process Equation (3) and calculate the droop resistance, $R_M$, or slope of the load line of the master module involved. For example, the process of calculating the slope of the load line of the master module can be accomplished by changing the master module's output current (e.g., by changing the load), or detuning one of the slave modules involved. The flow then proceeds (412) to determine if during the previous processing step, the slopes of the master module and the respective slave module were substantially identical and automatic trimming of the command voltage, $V_S$, was being performed to compensate for voltage offsets. On the other hand, the flow at (412) determines if during the previous processing step, the slopes of the master module and the respective slave module were not substantially identical, and automatic calibration of the droop resistance, $R_S$, of the slave module was being performed to align the load line of the slave module with the load line of the master module. If the command voltage, $V_S$, was being trimmed, the flow proceeds (414) to enable the digital controller of the slave module to utilize Equation (4) to align the load line of the slave module to the load line of the master module involved. The flow then proceeds to determine if the load line of the K$^{th}$ slave module is equal to the load line of the master module involved (404), as described above. However, if (412) during the last processing step, the slopes of the master module and the respective slave module were not substantially equal, the flow proceeds (416) to enable the digital controller of the slave module to utilize Equation (6) to align the load line of the slave module with the load line of the master module. The flow then proceeds to determine if the load line of the K$^{th}$ slave module (e.g., characterized by the droop resistance of that module) is equal to the load line of the master module involved (404), as described above.

Figure 5:
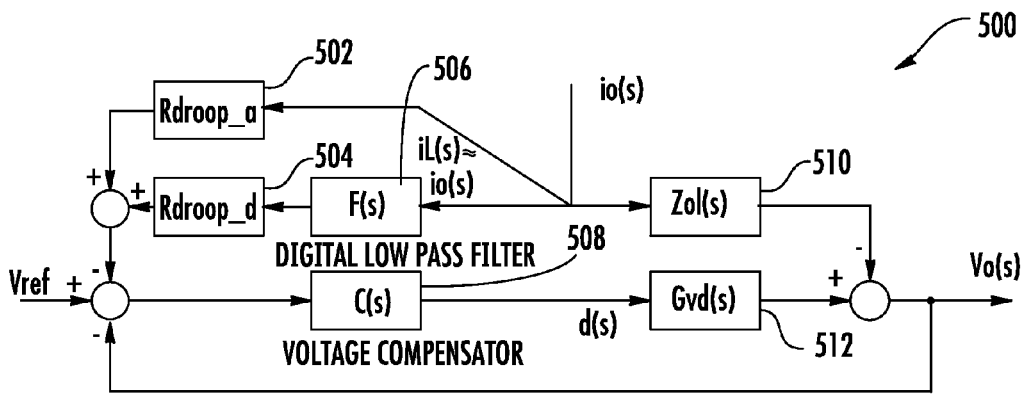
FIG. 5 depicts an exemplary control diagram reflected in the continuous time domain for a voltage converter utilizing voltage mode control in a power supply with enhanced phase current sharing, in accordance with one or more embodiments of the present invention.

FIG. 5 depicts an exemplary control diagram 500 reflected in the continuous time domain (e.g., transfer function) for a voltage converter utilizing voltage mode control in a power supply with enhanced phase current sharing, in accordance with one or more embodiments of the present invention. For example, in one embodiment, the voltage converter can be a DC-to-DC voltage converter such as, for example, a PWM buck converter. Referring to FIG. 5, the closed loop output impedance (observed at the output) for a slave module (e.g., a "slave" power module 102a-102n in FIG. 1) can be expressed as follows:

$$Z_{cl}(s) = \frac{-v_0(s)}{i_0(s)} = [R_{droop\_d}F(s) + R_{droop\_a}]\frac{T(s)}{1+T(s)} + Z_{0l}(s)\frac{1}{1+T(s)} \quad (7)$$

The parameter $R_{droop\_a}$ 502 represents the analog portion of the active droop control that can be realized utilizing an RC network such as the RC circuit including R1a-R1n, R2a-R2n, C1a-C1n shown in FIG. 1. For example, the analog droop portion 502 of the output impedance can be described by the $V_S$ trimming equation in block 406 shown in FIG. 4. Notably, the time constant mismatches of the RC networks of the different power modules are negligible and not included in Equation (7). Also, note that the active droop control utilized is effective at frequencies lower than the voltage loop bandwidth. Consequently, as shown in FIG. 5, the inductor current, iL(s), can be considered approximately equal to the load current, io(s), for the typical frequency range involved. The parameter $R_{droop\_d}$ 504 represents the digital droop resistance that can be trimmed by the automatic calibration portion of the active droop control being utilized. For example, the digital droop portion 504 of the active droop control can be described by the $R_S$ trimming equations shown in block 408 in FIG. 4. Notably, the analog droop portion 502 is the dominant parameter compared with the digital droop portion 504, and as such, the digital droop portion 504 can be utilized primarily for fine tuning to compensate for command voltage mismatches that can occur while utilizing the analog droop portion 502. Essentially, the resistance value of the digital droop portion is a gain term, which can be trimmed utilizing the automatic calibration algorithm residing in the firmware of the digital controller involved. A low pass digital filter 506 is utilized to pass the sensed current signal with the high frequency component of the current signal removed. For example, the filter 506 can be a digital, moving average filter with a relatively low sampling rate, which can provide a large latency for the digital droop portion of the active droop. A voltage mode control compensator 508 is provided to minimize the error of the signal at its input. For example, in one embodiment, the voltage mode control compensator 508 can be implemented utilizing a proportional-integral-derivative (PID) controller in a digitally-controlled voltage converter such as a buck converter. The open loop output impedance observed from the output of the voltage converter is depicted in block 510. A control to output transfer function Gvd(s) 512 is depicted in block 512. The parameter Vref is the reference voltage for a power module 102a-102n at zero load current. For example, the parameter Vref can be the reference voltage, $V_M$, for a master power module, and the reference voltage, $V_S$, for a slave power module. In summary, the analog droop portion 502 is the dominant parameter in the voltage mode control implementation, and the digital droop portion 504 is provided to trim and thereby calibrate out command voltage mismatches that can occur while implementing the analog droop portion 502.

Figure 6:
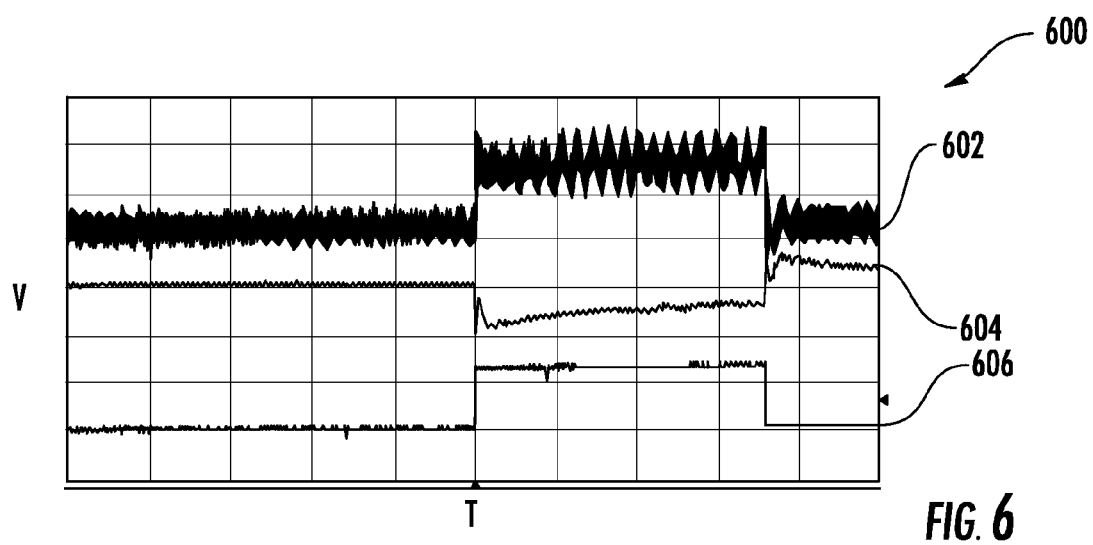
FIG. 6 is a graph that depicts a simulated voltage converter with dynamic phase current sharing utilizing only digital droop control in a high voltage loop bandwidth.

FIG. 6 is a graph that depicts a simulated voltage converter with dynamic phase current sharing utilizing only digital droop control in a high voltage loop bandwidth. In other words, an RC network is not included in this simulation to provide the analog droop control. In the simulation shown, the slave module's command voltage trimming, $V_S$, is active through the power supply's digital communication bus. Referring to FIG. 6, the trace 602 indicates the inductor current for two phases (10 A/div.), the trace 604 indicates the output voltage (20 mV/div.), and the trace 606 indicates the load current (20 A/div.). Notably, FIG. 6 illustrates that due to the inherent delay of the digital droop, the phase current sharing becomes unstable particularly when the voltage loop bandwidth is high.

Figure 7:
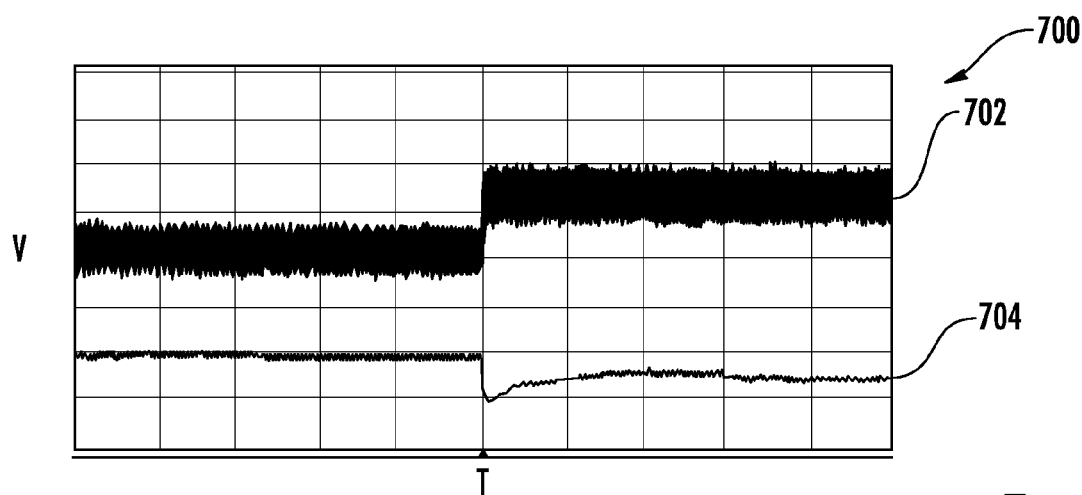
FIG. 7 is a graph that depicts a simulated voltage converter with dynamic phase current sharing utilizing only analog droop control in a high voltage loop bandwidth.

FIG. 7 is a graph that depicts a simulated voltage converter with dynamic phase current sharing utilizing only analog droop control in a high voltage loop bandwidth. In other words, an RC network is included in this simulation to provide the analog droop control. In this simulation, the PCB layout is not symmetrical, and the resistances and capacitances of the RC networks for the "n" power modules involved are individually tuned to achieve the same droop value and thereby cancel out the PCB asymmetry. In the simulation shown, the slave module's command voltage trimming, $V_S$, is active through the power supply's digital communication bus. Referring to FIG. 7, the trace 702 indicates the inductor current for three phases (10 A/div.), and the trace 704 indicates the output voltage (20 mV/div.). Notably, this simulation demonstrates that excellent phase current sharing can be achieved utilizing analog droop control alone, but the design complexity of this approach is increased due to the need to individually tune the resistances and capacitances of the RC networks involved.

Figure 8:
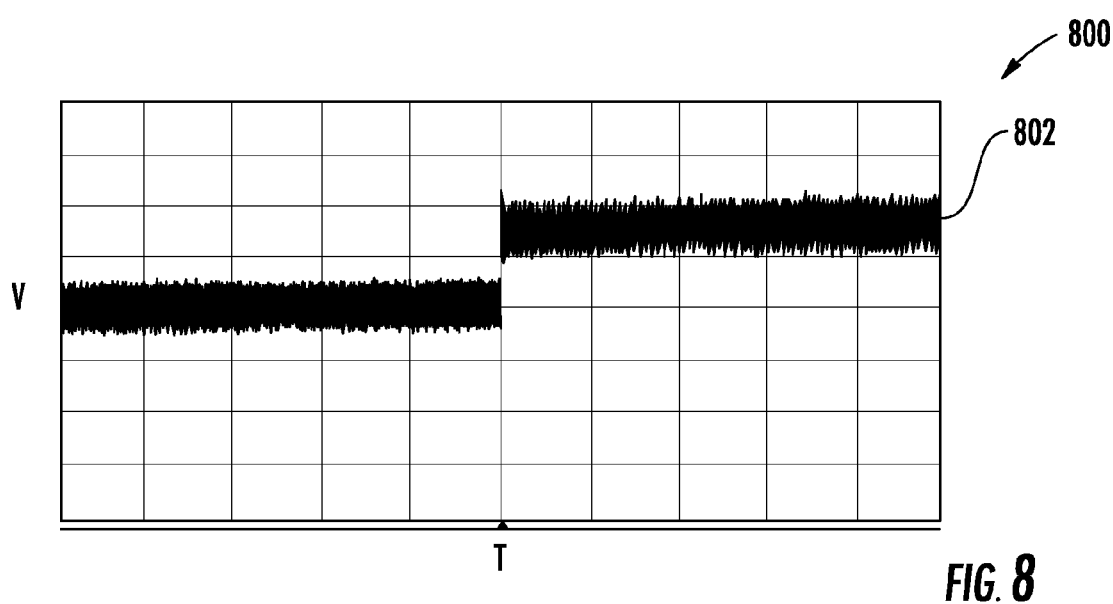
FIG. 8 is a graph that depicts a simulated voltage converter with dynamic phase current sharing utilizing both analog droop control and digital droop control in a high voltage loop bandwidth, in accordance with one embodiment of the invention.

FIG. 8 is a graph that depicts a simulated voltage converter with dynamic phase current sharing utilizing both analog droop control and digital droop control in a high voltage loop bandwidth, in accordance with one exemplary embodiment of the present invention. In this case, identical RC networks are utilized to generate the analog droop for each power module involved. Also, digital calibration is being utilized to cancel out the droop mismatches that can occur due to the asymmetry of the PCB layouts involved. In the simulation shown, the slave module's command voltage trimming, $V_S$, is active through the power supply's digital communication bus. The resistance values and capacitance values of each of the RC networks involved are fixed. Referring to FIG. 8, the trace 802 indicates the inductor current for three shared phases (10 A/div.). Notably, this simulation demonstrates that excellent phase current balancing can be achieved utilizing both analog droop control and digital droop control, and the design complexity of this approach is significantly decreased (compared to the approach illustrated in FIG. 7) due to the use of the identical RC networks.

Figure 9:
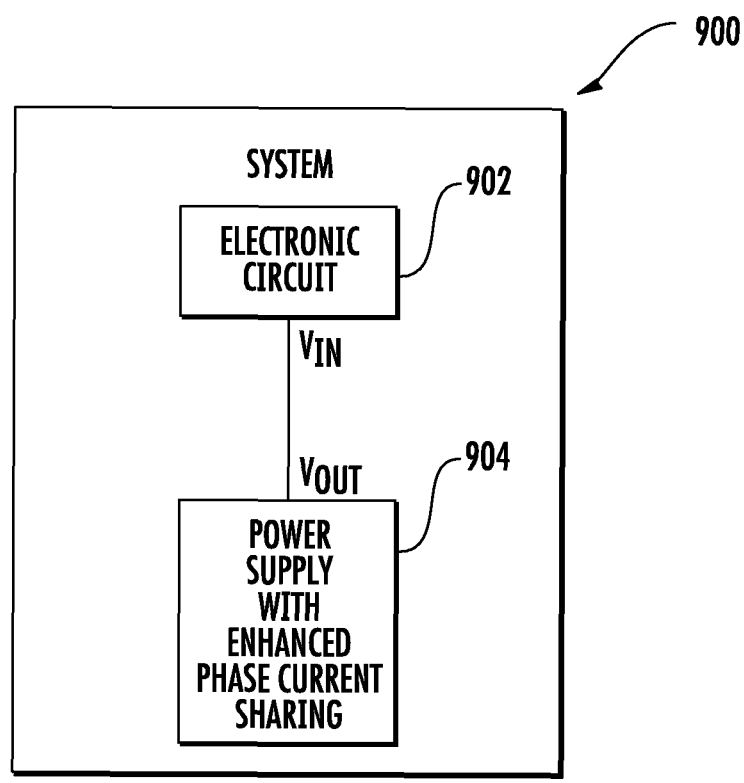
FIG. 9 is a schematic block diagram of an exemplary system, which can be utilized to implement one or more exemplary embodiments of the present invention.

FIG. 9 is a schematic block diagram of an exemplary system 900, which can be utilized to implement one or more exemplary embodiments of the present invention. For example, in one embodiment, system 900 includes one or more electronic circuits 902, and one or more one power supplies with enhanced phase current sharing 904. For example, one or more of the power supplies 904 can be implemented with the power supply 100 shown in FIG. 1. The output voltage, Vout, of the one or more power supplies 904 is coupled to an input terminal, Vin, of the one or more electronic circuits 902. Consequently, the performance of the one or more electronic circuits 902 is significantly enhanced compared to conventional electronic circuits. For example, the one or more power supplies 904 with enhanced current sharing can be utilized in a server system, telecommunication system, data storage system, data communication system, and the like. Also, for example, the one or more power supplies 904 with enhanced current sharing can be utilized to provide power for one or more ASICs, FPGAs, DSPs, and/or memory stages in the electronic circuits 902 involved.

Example Embodiments

Example 1 includes a power supply, comprising: a plurality of power modules; a communication bus coupled to an input of each power module of the plurality power modules; and an output voltage node coupled to a first side of an inductor of each power module of the plurality of power modules, wherein each power module of the plurality of power modules includes a digital controller coupled to the input of the power module, and an RC circuit enabled to generate a feedback signal, coupled to a second side of the inductor and the output voltage node.

Example 2 includes the power supply of Example 1, wherein the RC circuit is further coupled to an input of the digital controller.

Example 3 includes the power supply of any of Examples 1-2, wherein the RC circuit is connected to an input of the digital controller and enabled to generate an analog feedback signal associated with voltage droop at the output voltage node and couple the analog feedback signal to an input of the digital controller.

Example 4 includes the power supply of any of Examples 1-3, wherein said each power module of the plurality of power modules includes a plurality of pulse width modulated (PWM) switches, and a phase node coupled to an output terminal of the plurality of PWM switches and the second side of the inductor.

Example 5 includes the power supply of any of Examples 3-4, wherein the digital controller is enabled to receive the signal associated with voltage droop, determine a command voltage value to compensate for command voltage mismatches associated with the voltage droop, and output a control signal associated with the command voltage value.

Example 6 includes the power supply of any of Examples 1-5, further comprising a printed circuit board (PCB) component coupled between the first side of the inductor and the output voltage node.

Example 7 includes the power supply of any of Examples 1-6, wherein the digital controller is enabled to generate a control signal to align a load line of a first power module with a load line of a second power module.

Example 8 includes the power supply of any of Examples 1-7, wherein a first power module of the plurality of power modules is a master module and a second power module of the plurality of power modules is a slave module.

Example 9 includes the power supply of any of Examples 1-8, wherein the communication bus comprises a communication bus enabled to operate in accordance with an I$^2$C communication protocol or SMBus communication protocol.

Example 10 includes a method of operation of a power supply, comprising: determining if the power supply is operating in a startup mode or a steady state mode; if the power supply is operating in the startup mode, determining if a slope of a load line for a first power module of the power supply is substantially equal to a slope of a load line for a second power module of the power supply; if the slope of the load line for the first power module is substantially equal to the slope of the load line for the second power module, generating a control voltage to align the load line of the second power module with the load line of the first power module; and if the slope of the load for the first power module is not substantially equal to the slope of the load line for the second power module, generating a droop resistance correction signal to align the load line of the second power module with the load line of the first power module, wherein the droop resistance correction signal is associated with a digital droop resistance value and an analog droop resistance value.

Example 11 includes the method of Example 10, further comprising: if the power supply is operating in the steady state mode, determining the slope of the load line for the first power module; determining if a previous control voltage value or a previous droop resistance value was being utilized to align the load line of the second power module with the load line of the first power module; if the previous control voltage was being utilized to align the load line of the second power module with the load line of the first power module, generating a droop resistance value utilizing the previous control voltage value; and if the previous droop resistance value was being utilized to align the load line of the second power module with the load line of the first power module, generating the droop resistance value utilizing the previous droop resistance value.

Example 12 includes a multiphase power supply, comprising: a plurality of power modules, wherein each power module of the plurality of power modules includes: a digital controller, wherein an input of the digital controller is coupled to a data communication line, and an output of the digital controller is coupled to a control input of a voltage regulator; a resistive component coupled to an inductor of the voltage regulator and a common output voltage node of the multiphase power supply; and an RC circuit coupled across the inductor and the resistive component.

Example 13 includes the multiphase power supply of Example 12, wherein the resistive component comprises a printed circuit board or a component with a resistive value.

Example 14 includes the multiphase power supply of any of Examples 12-13, wherein the RC circuit is further coupled to a voltage sensing input of the digital controller.

Example 15 includes a system, comprising: an electronic circuit; and a multiple phase power supply coupled to the electronic circuit, wherein the multiple phase power supply comprises: a plurality of power modules; a communication bus coupled to an input of each power module of the plurality power modules; and an output voltage node coupled to a first side of an inductor of each power module of the plurality of power modules, wherein each power module of the plurality of power modules includes a digital controller coupled to the input of the power module, and an RC circuit coupled to a second side of the inductor and the output voltage node.

Example 16 includes the system of Example 15, wherein the system comprises a terminal system, telecommunication system, data storage system, or data communication system.

Example 17 includes the system of any of Examples 15-16, wherein the electronic circuit comprises at least one ASIC, FPGA, DSP, controller, or memory storage device.

Example 18 includes a multiple phase power supply, comprising: a first controller enabled to receive a first digital signal at a first input and a first analog signal at a second input, wherein the first digital signal is a first control signal and the first analog signal is a first feedback signal associated with voltage droop at an output node of the power supply; a first power converter coupled to an output of the first controller and enabled to generate a first phase current of the multiple phase power supply responsive to the first digital signal and the first analog signal; a second controller enabled to receive a second digital signal at a third input and a second analog signal at a fourth input, wherein the second digital signal is a second control signal and the second analog signal is a second feedback signal associated with the voltage droop at the output node of the multiple phase power supply; and a second power converter coupled to an output of the second controller and enabled to generate a second phase current of the power supply responsive to the second digital signal and the second analog signal.

Example 19 includes the multiple phase power supply of Example 18, wherein the first controller and the first power converter comprise a first power module, the second controller and the second power converter comprise a second power module, and the first power module and the second power module are formed on a semiconductor integrated circuit (IC), wafer, chip or die.

Example 20 includes the multiple phase power supply of any of Examples 18-19, wherein the first controller and the first power converter comprise a first power module, the second controller and the second power converter comprise a second power module, and the first power module and the second power module are formed on a power management IC (PMIC).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that the present invention be limited only by the claims and the equivalents thereof.

What is claimed is:

1. A power supply, comprising:
   a plurality of power modules;
   a communication bus coupled to an input of each power module of the plurality power modules; and
   an output voltage node coupled to a first side of an inductor of each power module of the plurality of power modules, wherein each power module of the plurality of power modules includes a digital controller coupled to the input of the power module, wherein the digital controller includes a voltage sense input enabled to receive an analog feedback signal generated by an RC circuit, coupled to a second side of the inductor, and across at least one printed circuit board (PCB) trace dedicated as a resistive component disposed between the inductor and the output voltage node at a load side, and wherein responsive to at least one of the analog feedback signal and a signal on the communication bus, the digital controller is enabled to generate a control signal to substantially align a load line of a first power module of the plurality of power modules with a load line of a second power module of the plurality of power modules.

2. The power supply of claim 1, wherein the RC circuit is further coupled to a positive voltage sense input of the digital controller.

3. The power supply of claim 1, wherein the RC circuit is connected to the voltage sense input of the digital controller and enabled to generate the analog feedback signal associated with voltage droop at the output voltage node and couple the analog feedback signal to the voltage sense input of the digital controller.

4. The power supply of claim 1, wherein said each power module of the plurality of power modules includes a plurality of pulse width modulated (PWM) switches, and a phase node coupled to an output terminal of the plurality of PWM switches and the second side of the inductor.

5. The power supply of claim 3, wherein the digital controller is enabled to receive the signal associated with voltage droop, determine a command voltage value to compensate for command voltage mismatches associated with the voltage droop, and output a control signal associated with the command voltage value.

6. The power supply of claim 1, wherein a first power module of the plurality of power modules is a master module and a second power module of the plurality of power modules is a slave module.

7. The power supply of claim 1, wherein the communication bus comprises a communication bus enabled to operate in accordance with an I²C communication protocol or SMBus communication protocol.

8. A multiphase power supply, comprising:
   a plurality of power modules, wherein each power module of the plurality of power modules includes:
   a digital controller, wherein an input of the digital controller is coupled to a data communication line, and an output of the digital controller is coupled to a control input of at least one power transistor;
   at least one PCB trace dedicated as a resistive component coupled to an inductor of the power module and a common output voltage node at a load side of the multiphase power supply; and
   an RC circuit enabled to generate an analog signal coupled across the inductor and the at least one PCB trace dedicated as a resistive component and to a voltage sense input of the digital controller, wherein responsive to the analog signal received at the voltage sense input of the digital controller and a data signal on the data communication line, the digital controller is enabled to generate a control signal at the control input of the at least one power transistor to move a load line of a first power module associated with the at least one power transistor and thereby substantially align the load line of the first power module with a load line of a second power module.

9. The multiphase power supply of claim 8, wherein the RC circuit is enabled to generate an analog voltage droop feedback signal coupled to a positive voltage sensing input of the digital controller.

10. A system, comprising:
    an electronic circuit; and
    a multiple phase power supply coupled to the electronic circuit, wherein the multiple phase power supply comprises:
    a plurality of power modules;
    a communication bus coupled to an input of each power module of the plurality power modules; and
    an output voltage node coupled to a first side of an inductor of each power module of the plurality of power modules, wherein each power module of the plurality of power modules includes a digital controller coupled to the input of the power module, wherein the digital controller includes a voltage sense input enabled to receive an analog signal generated by an RC circuit coupled to a second side of the inductor, and across at least one PCB trace dedicated as a resistive component disposed between the inductor and the output voltage node at a load side, and responsive to at least one of the analog feedback signal and a signal on the communication bus, the digital controller is enabled to generate a control signal to substantially align a load line of a first power module of the plurality of power modules with a load line of a second power module of the plurality of power modules.

11. The system of claim 10, wherein the system comprises a terminal system, telecommunication system, data storage system, or data communication system.

12. The system of claim 10, wherein the electronic circuit comprises at least one ASIC, FPGA, DSP, controller, or memory storage device.

13. A controller, comprising:
- a voltage sense input enabled to receive an analog feedback signal associated with voltage droop at a load side of a power supply, wherein the analog feedback signal is generated by an RC circuit coupled across a PCB trace dedicated as a resistive component disposed at the load side and between an output voltage node at the load side and an inductor of the power supply;
- a current sense input enabled to receive a voltage signal associated with a total output current of the power supply;
- a control input enabled to receive a digital signal associated with the voltage droop of the power supply; and
- a processor enabled to generate a voltage droop compensation value from the analog feedback signal, the digital signal, and the voltage signal.

14. The controller of claim 13, further comprising:
- at least one control output enabled to output the at least one control signal associated with the voltage droop compensation value.

15. The controller of claim 13, wherein the controller is formed on a semiconductor integrated circuit (IC), wafer, chip or die.

\* \* \* \* \*

UNITED STATES PATENT AND TRADEMARK OFFICE
CERTIFICATE OF CORRECTION

PATENT NO. : 9,748,846 B2
APPLICATION NO. : 14/466846
DATED : August 29, 2017
INVENTOR(S) : Jiang et al.

Page 1 of 1

It is certified that error appears in the above-identified patent and that said Letters Patent is hereby corrected as shown below:

On the Title Page

Item (57), under "ABSTRACT", in Column 2, Line 6, delete "plurality power" and insert -- plurality of power --, therefor.

In the Specification

In Column 5, Line 58, delete "N" and insert -- N. --, therefor.

In Column 11, Line 14, delete "plurality power" and insert -- plurality of power --, therefor.

In Column 12, Line 48, delete "plurality power" and insert -- plurality of power --, therefor.

In the Claims

In Column 13, Line 38, in Claim 1, delete "plurality power" and insert -- plurality of power --, therefor.

In Column 14, Line 53, in Claim 10, delete "plurality power" and insert -- plurality of power --, therefor.

In Column 14, Line 60, in Claim 10, delete "circuit" and insert -- circuit, --, therefor.

Signed and Sealed this
Twenty-fourth Day of April, 2018

Andrei Iancu
*Director of the United States Patent and Trademark Office*